(12) United States Patent
Bengtsson et al.

(10) Patent No.: US 6,539,838 B1
(45) Date of Patent: Apr. 1, 2003

(54) DEEP-FRYER

(75) Inventors: Jan Bengtsson, Hässleholm (SE); Magnus Kalling, Fjälkinge (SE)

(73) Assignee: Potato Processing Machinery AB, Kristianstad (SE)

(*) Notice: Subject to any disclaimer, the term of this patent is extended or adjusted under 35 U.S.C. 154(b) by 0 days.

(21) Appl. No.: 10/110,137

(22) PCT Filed: Oct. 18, 2000

(86) PCT No.: PCT/SE00/02011
§ 371 (c)(1),
(2), (4) Date: Apr. 9, 2002

(87) PCT Pub. No.: WO01/28395
PCT Pub. Date: Apr. 26, 2001

(30) Foreign Application Priority Data

Oct. 18, 1999 (SE) .............................................. 9903762

(51) Int. Cl.⁷ ................................................ A47J 37/12
(52) U.S. Cl. ................................ 99/330; 99/403; 99/404
(58) Field of Search ........................... 99/330, 403–410, 99/411–417, 443 C, 443 R, 386; 126/380.1, 391.1, 389.1

(56) References Cited

U.S. PATENT DOCUMENTS

| | | | | |
|---|---|---|---|---|
| 4,187,771 A | * | 2/1980 | Westover et al. | 99/404 |
| 4,269,113 A | | 5/1981 | Ishida | |
| 4,357,862 A | * | 11/1982 | Anstett et al. | 99/355 |
| 4,386,559 A | * | 6/1983 | El-Hag et al. | 99/404 |
| 4,852,475 A | * | 8/1989 | Yang | 99/404 |
| 5,074,199 A | * | 12/1991 | Miller | 99/404 |
| 5,253,567 A | * | 10/1993 | Gunawardena | 99/404 |
| 6,152,023 A | * | 11/2000 | Lihotzky-Vaupel | 99/404 |

FOREIGN PATENT DOCUMENTS

DE 24 44 746 A1 10/1975
EP 0 903 084 A2 3/1999

* cited by examiner

*Primary Examiner*—Timothy F. Simone
(74) *Attorney, Agent, or Firm*—Burns, Doane, Swecker & Mathis, L.L.P.

(57) ABSTRACT

A deep-fryer having an elongate deep-frying trough and an endless conveyor belt, which is arranged to travel along a carrying run along the bottom of the deep-frying trough from an inlet end to an outlet end. Products introduced at the inlet end into a bath of oil in the deep-frying trough are thus moved through the deep-frying trough to the outlet end. A driven deflecting roller at the outlet end is adapted to drivingly engage the conveyor belt. A deflecting roller at the inlet end is also adapted to drivingly engage the conveyor belt and is arranged to move the same synchronously with the deflecting roller at the outlet end. A driving motor is arranged for driving the two deflecting rollers and is connected to drive a driving shaft arranged between the inlet end and the outlet end of the deep-frying trough and which is connected to the respective deflecting rollers via a respective angular gear.

20 Claims, 3 Drawing Sheets

DEEP-FRYER

BACKGROUND OF THE INVENTION

The present invention relates to a deep-fryer, which comprises an elongate deep-frying trough and an endless conveyor belt, which is arranged to travel along a carrying run along the bottom of the deep-frying trough from an inlet end to an outlet end thereof and to travel along a return run from the outlet end back to the inlet end.

Such deep-fryers are known and usually have a deflecting roller at the inlet end and a deflecting roller at the outlet end, which deflecting rollers form transitions between the carrying run and the return run. The run of the conveyor belt in the deep-frying trough is usually directed by means of guides, which engage the conveyor belt at its side edges and forces it to travel along run portions, which are angled to each other. The movement of the conveyor belt in the deep-frying trough is obtained by the deflecting roller at the outlet end, which deflecting roller is adapted to drivingly engage the conveyor belt and is itself rotated by a driving motor. However, also the deflecting roller at the inlet end can be adapted to drivingly engage the conveyor belt.

It goes without saying that in large deep-fryers having a long and/or wide deep-frying trough the conveyor belt has corresponding dimensions, which makes the driving heavy and often makes the conveyor belt bend in an undesirable manner along the carrying run.

SUMMARY OF THE INVENTION

Therefore one object of the present invention is to eliminate these drawbacks of prior-art deep-fryers of the above-mentioned kind.

According to the invention, this object is achieved by the deep-fryer, which is of the kind stated by way of introduction, being given the features defined in appended claim 1. Preferred embodiments of this deep-fryer are stated in the dependent claims.

According to the invention, one and the same driving motor is thus used for driving the two deflecting rollers. Furthermore, the driving motor is connected to drive a driving shaft, which is arranged between the inlet end and the outlet end of the deep-fryer trough and which is connected to the respective deflecting rollers via a respective angular gear for synchronous movement of the conveyor belt at the inlet end and the outlet end. As a result, the tensile stress in the conveyor belt will be considerably reduced in the carrying run, where the bending tendency can be completely eliminated, as well as in the return run. Moreover, this construction makes the synchronisation of the feeding effected by the deflecting rollers positively operated and thus completely secured.

According to a preferred embodiment, the two angular gears have the same gear ratio and thus the two deflecting rollers have the same diameter to obtain synchronous feeding of the conveyor belt.

To adjust the length of the conveyor belt along the carrying run, the driving shaft can be divided into two parts, whose relative angular position is adjustable.

By the inventive design of the deep-fryer, the stress exerted on the conveyor belt can thus be reduced to a very large extent, and consequently there is no risk that the conveyor belt will bend along the carrying run. Furthermore, the conveyor belt does not have to be positively operated by means of guides to press it down to the bottom of the deep-frying trough, but the conveyor belt can be conveyed along the carrying run on simple sliding bars, which considerably reduces the friction that counter-acts the movement of the conveyor belt. Finally, the conveyor belt can be made to travel along a relatively steep run from the deflecting roller at the inlet end down to the bottom of the deep-frying trough, so that the outside dimensions of the length of the deepfryer can be considerably reduced without reducing the length of the distance that the conveyor belt moves along the bottom of the deep-frying trough. The reduction of the distance up to the oil bath in the deep-frying trough also facilitates the feeding of the products that are to be deep-fried, i.e. the feeding device can be made shorter.

BRIEF DESCRIPTION OF THE DRAWINGS

An embodiment of a deep-fryer according to the present invention will now be described in more detail with reference to the accompanying drawings.

DETAILED DESCRIPTION OF THE PREFERRED EMBODIMENTS

Figure 1:
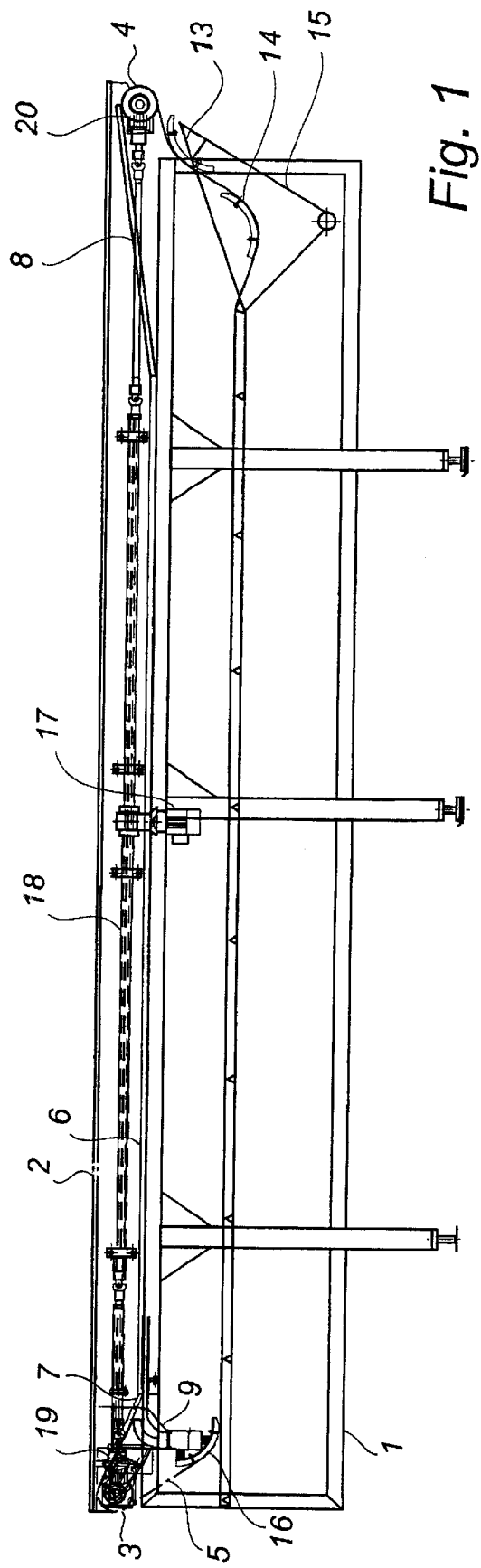
FIG. 1 is a side view of a deep-fryer according to the present invention.

The embodiment of a deep-fryer, which is shown in the drawings, comprises a frame 1, which supports a deep-frying trough 2, two deflecting rollers 3 and 4 and a conveyor belt 5. The conveyor belt 5 extends from the deflecting roller 3, which is arranged at an inlet end of the deep-fryer, along a carrying run along the bottom 6 of the deep-frying trough 2 to the deflecting roller 4, which is arranged at an outlet end of the deep-fryer. In addition to a horizontal main portion, this carrying run also comprises a relatively steep run portion 7 having a slope of at least about 25° from the deflecting roller 3 at the inlet end down to the bottom 6 of the deep-frying trough 2 as well as a run portion 8 from the bottom 6 up to the deflecting roller 4. The slope of this run portion 8 is smaller than the slope of the run portion 7 to enable the conveyor belt 5 to entrain the fried products out of the oil bath in the deep-frying trough 2.

An inlet 9 for oil is arranged in the deep-frying trough 2 immediately over its bottom 6 and behind the relatively steep run portion 7 of the conveyor belt 5. The inlet 9 extends over the entire width of the deep-frying frying trough 2 and is divided by means of a partition wall 10 into an upper inlet portion 11 and a lower inlet portion 12, which are mutually displaced to be closely fitted to the relatively steep run portion 7 of the conveyor belt 5. The height of the inlet 9 substantially equals the intended depth of the oil bath in the deep-frying trough 2, since backward oil vortices can then be avoided. Such backward oil vortices can prevent or delay the transport of products, which have been introduced at the inlet end, towards the outlet end and are thus not desirable.

The conveyor belt 5 travels along a return run from the deflecting roller 4 at the outlet end under the deep-frying trough 2 back to the deflecting roller 3 at the inlet end. The conveyor belt 5 first passes two curved guide bars 13 and 14 for guiding the conveyor belt 5 from the deflecting roller 4 to a straight portion of the return run. The curved guide bars 13 and 14 are arranged over a collection tank 15 for deep-frying oil, which is entrained by the conveyor belt 5 out of the deep-frying trough 2. The deep-frying oil which is directed to the collection tank 15 can be returned to the deep-frying trough 2, but preferably not until after filtration and suitable heating.

Advantageously, the guide bars 14 can be included in a device for compensating variations in the length of the conveyor belt 5. The conveyor belt then passes over curved guide bars 16 at the inlet end for guiding the conveyor belt 5 from the straight portion of the return run to the deflecting roller 3.

The deflecting rollers 3, 4 are adapted to drivingly engage the conveyor belt 5 to move the same along the carrying run and the return run. A motor 17 is arranged for driving the deflecting rollers 3, 4, which motor is connected to a driving shaft 18 that via angular gears 19, 20 drives the deflecting rollers 3 and 4, respectively, to rotate.

Figure 2:
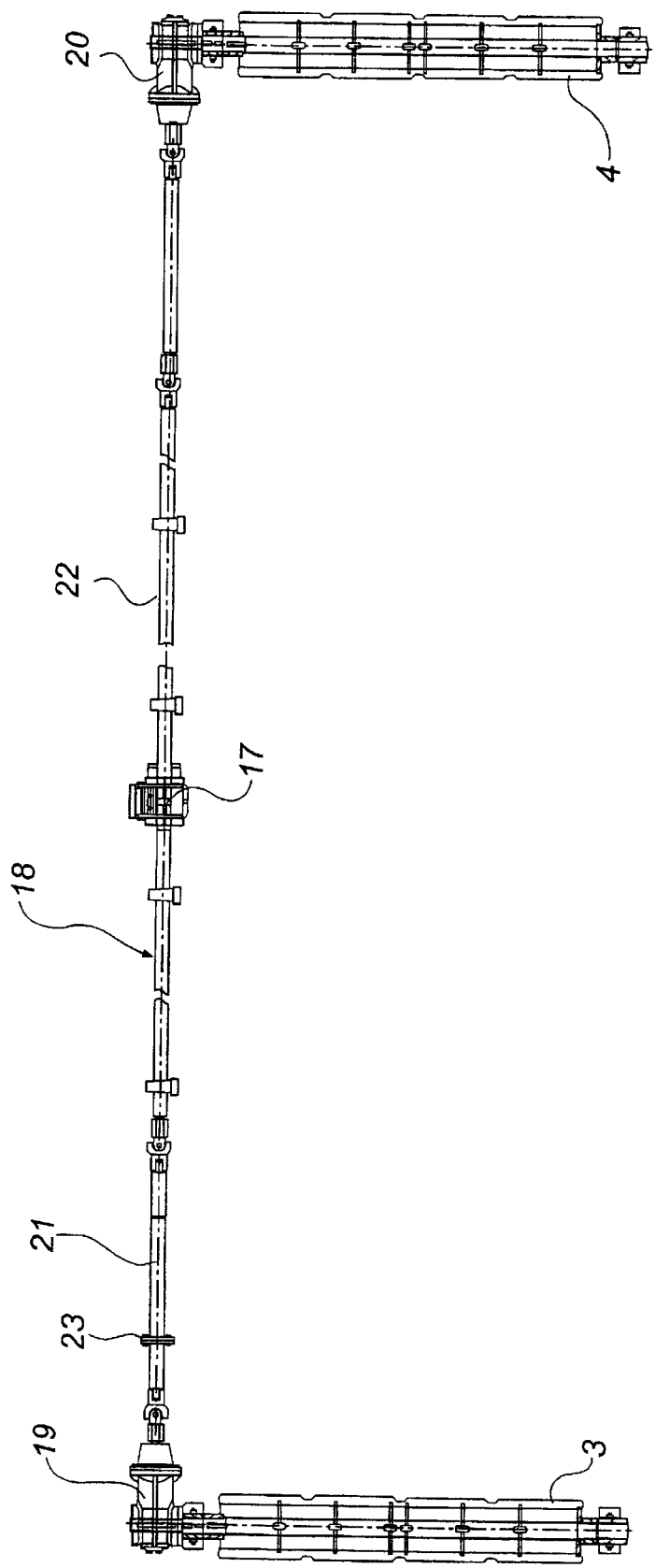
FIG. 2 is a top plan view of a driving line for a conveyor belt in a deep-fryer according to FIG. 1.
Figure 3:
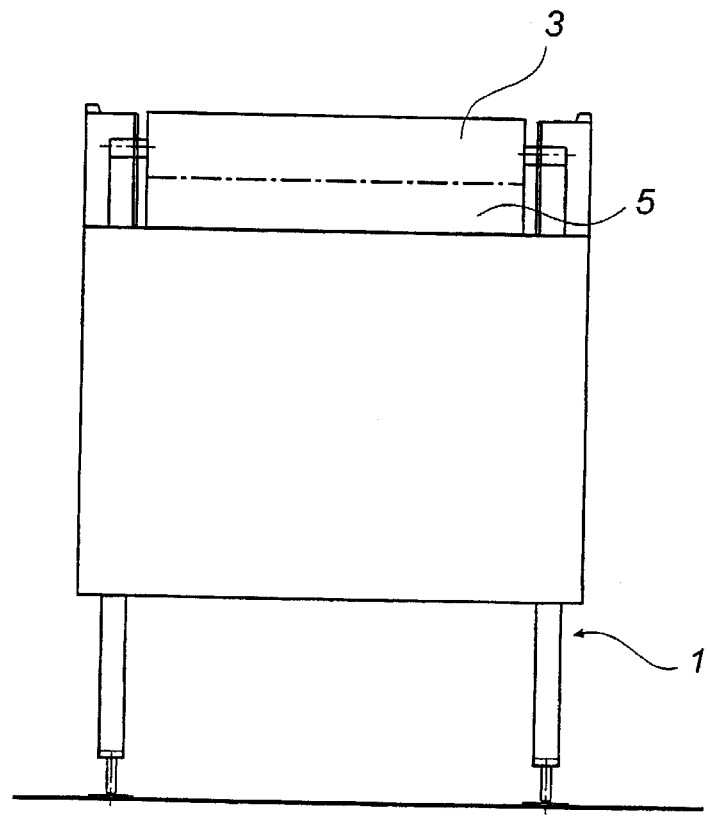
FIG. 3 is an end view of the deep-fryer according to FIG. 1.
Figure 4:
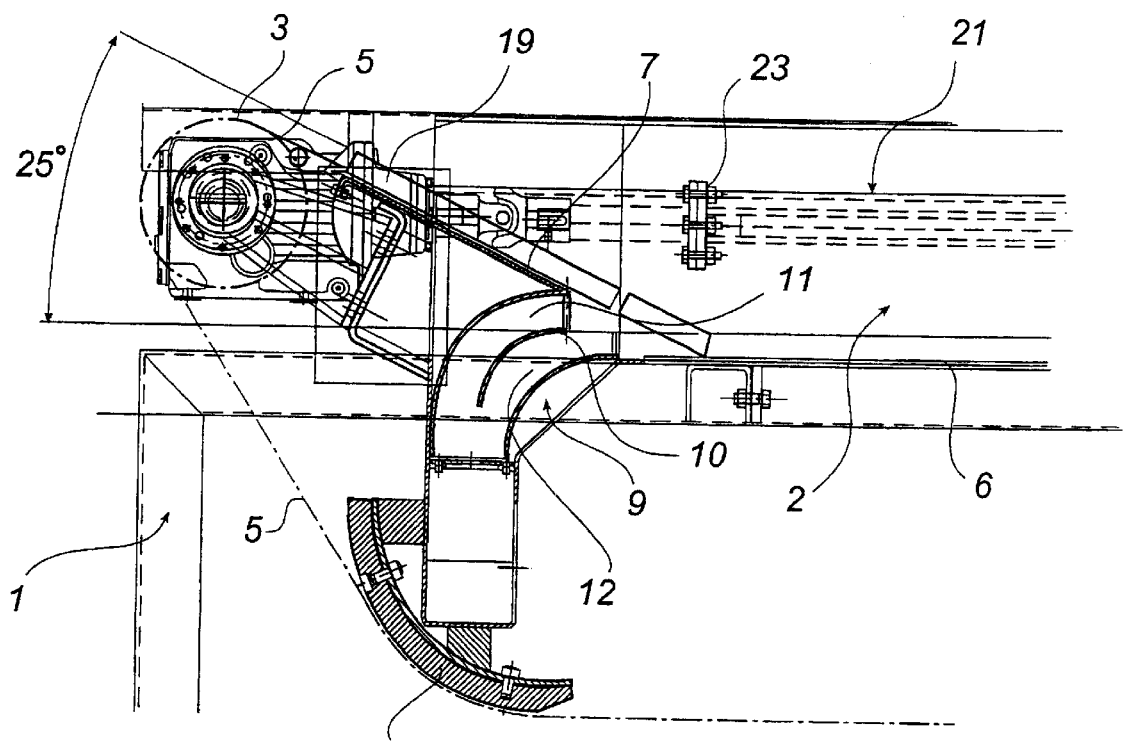
FIG. 4 is a partial view on a larger scale of the inlet end of the deep-fryer in FIG. 1.

The driving shaft 18 extends along a long side of the deep-frying trough 2 and is divided into two parts 21, 22 for driving the deflecting rollers 3, 4 via a respective angular gear 19, 20. The angular positions of the two driving shaft parts 21, 22 are relatively adjustable by means of a coupling 23, which is part of the driving shaft part 21 and which is shown in FIGS. 2 and 4 as two discs that can be fixed in relation to each other in different turning positions. An adjustment of the angular positions by means of the coupling 23 results in a change of the length of the portion of the conveyor belt 5 in the carrying run between the deflecting rollers 3, 4. The corresponding change in the length of the conveyor belt 5 in the return run is suitably compensated by the length compensating device with the guide bars 14.

The two angular gears 19, 20 preferably have the same gear ratio, in which case the deflecting rollers 3, 4 should have the same diameter to be able to move the conveyor belt 5 synchronously, i.e. so that the length of the portion of the conveyor belt 5 between the deflecting rollers 3, 4 is not changed.

The person skilled in the art will understand that several modifications of the above-described embodiment of a deep-fryer are possible within the scope of the invention, such as defined in the appended claims.

What is claimed is:

1. A deep-fryer comprising:
   an elongate deep-frying trough and an endless conveyor belt, said conveyor belt being arranged to travel along a travel path along a bottom of the deep-frying trough from an inlet end to an outlet end, so that products introduced at the inlet end into a bath of oil in the deep-frying trough are moved through the deep-frying trough to the outlet end,
   a driven deflecting roller at the outlet end being adapted to drivingly engage the conveyor belt, and a deflecting roller at the inlet end also being adapted to drivingly engage the conveyor belt, and
   a driving motor arranged for driving the two deflecting rollers and connected to drive a driving shaft, which is arranged between the inlet end and the outlet end of the deep-frying trough and which is connected to each of the respective deflecting rollers through a respective angular gear for synchronous movement of the conveyor belt at the inlet end and the outlet end.

2. A deep-fryer as claimed in claim 1, wherein the two angular gears have the same gear ratio and the two deflecting rollers have the same diameter.

3. A deep-fryer as claimed in claim 1, wherein the driving shaft is divided into two parts, a relative angular position of the two parts being adjustable.

4. A deep-fryer as claimed in claim 3, wherein curved sliding bars are arranged in a return travel path for guiding the conveyor belt to the deflecting roller at the inlet end and away from the deflecting roller at the outlet end.

5. A deep-fryer as claimed in claim 1, wherein the conveyor belt is adapted to move along a relatively steep run portion having a slope of at least about 25° from the deflecting roller at the inlet end down to the bottom of the deep-frying trough.

6. A deep-fryer as claimed in claim 5, wherein an inlet for oil into the deep-frying trough is arranged immediately over the bottom of the deep-frying trough and behind the relatively steep run portion of the conveyor belt.

7. A deep-fryer as claimed in claim 6, wherein the inlet extends over the entire width of the deep-frying trough and is divided by means of a horizontal partition wall into an upper inlet portion and a lower inlet portion, which are mutually displaced to be closely fitted to the relatively steep run portion of the conveyor belt.

8. A deep-fryer as claimed in claim 6, wherein a height of the inlet substantially equals an intended depth of the oil bath in the deep-frying trough.

9. A deep-fryer as claimed in claim 2, wherein the driving shaft is divided into two parts, whose relative angular position is adjustable.

10. A deep-fryer as claimed in claim 9, wherein curved sliding bars are arranged in a return travel path for guiding the conveyor belt to the deflecting roller at the inlet end and away from the deflecting roller at the outlet end.

11. A deep-fryer as claimed in claim 2, wherein the conveyor belt is adapted to move along a relatively steep run portion having a slope of at least about 25° from the deflecting roller at the inlet end down to the bottom of the deep-frying trough.

12. A deep-fryer as claimed in claim 3, wherein the conveyor belt is adapted to move along a relatively steep run portion having a slope of at least about 25° from the deflecting roller at the inlet end down to the bottom of the deep-frying trough.

13. A deep-fryer as claimed in claim 4, wherein the conveyor belt is adapted to move along a relatively steep run portion having a slope of at least about 25° from the deflecting roller at the inlet end down to the bottom of the deep-frying trough.

14. A deep-fryer as claimed in claim 9, wherein the conveyor belt is adapted to move along a relatively steep run portion having a slope of at least about 25° from the deflecting roller at the inlet end down to the bottom of the deep-frying trough.

15. A deep-fryer as claimed in claim 10, wherein the conveyor belt is adapted to move along a relatively steep run portion having a slope of at least about 25° from the deflecting roller at the inlet end down to the bottom of the deep-frying trough.

16. A deep-fryer as claimed in claim 11, wherein an inlet for oil into the deep-frying trough is arranged immediately over the bottom of the deep-frying trough and behind the relatively steep run portion of the conveyor belt.

17. A deep-fryer as claimed in claim 12, wherein an inlet for oil into the deep-frying trough is arranged immediately over the bottom of the deep-frying trough and behind the relatively steep run portion of the conveyor belt.

18. A deep-fryer as claimed in claim 13, wherein an inlet for oil into the deep-frying trough is arranged immediately over the bottom of the deep-frying trough and behind the relatively steep run portion of the conveyor belt.

19. A deep-fryer as claimed in claim 14, wherein an inlet for oil into the deep-frying trough is arranged immediately over the bottom of the deep-frying trough and behind the relatively steep run portion of the conveyor belt.

20. A deep-fryer as claimed in claim 7, wherein a height of the inlet substantially equals an intended depth of the oil bath in the deep-frying trough.

* * * * *